(12) United States Patent
Lim et al.

(10) Patent No.: US 9,363,389 B2
(45) Date of Patent: Jun. 7, 2016

(54) MOBILE COMMUNICATION SYSTEM AND METHOD FOR MANAGING SIGNALING MESSAGE IN SYSTEM THEREOF

(75) Inventors: Han Na Lim, Seoul (KR); Chae Gwon Lim, Seoul (KR); Beom Sik Bae, Suwon-si (KR); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/695,724

(22) PCT Filed: May 3, 2011

(86) PCT No.: PCT/KR2011/003302
§ 371 (c)(1),
(2), (4) Date: Nov. 1, 2012

(87) PCT Pub. No.: WO2011/139072
PCT Pub. Date: Nov. 10, 2011

(65) Prior Publication Data
US 2013/0051282 A1    Feb. 28, 2013

(30) Foreign Application Priority Data
May 3, 2010    (KR) .................. 10-2010-0041521

(51) Int. Cl.
*H04W 4/00*    (2009.01)
*H04M 15/00*    (2006.01)
*H04L 12/14*    (2006.01)
*H04W 4/24*    (2009.01)

(52) U.S. Cl.
CPC ........... *H04M 15/00* (2013.01); *H04L 12/1403* (2013.01); *H04W 4/24* (2013.01); *H04L 12/1432* (2013.01)

(58) Field of Classification Search
None
See application file for complete search history.

(56) References Cited

U.S. PATENT DOCUMENTS

| | | | |
|---|---|---|---|
| 8,462,710 B2* | 6/2013 | Walker et al. .................. | 370/329 |
| 2004/0077333 A1* | 4/2004 | Koskinen et al. ............. | 455/406 |
| 2004/0266391 A1 | 12/2004 | Hafren | |
| 2005/0055220 A1 | 3/2005 | Lee et al. | |
| 2009/0042539 A1* | 2/2009 | Jiang et al. ..................... | 455/408 |
| 2009/0042575 A1* | 2/2009 | Voyer .................... | H04W 8/065 455/436 |
| 2009/0270097 A1* | 10/2009 | Gallagher et al. ......... | 455/435.1 |
| 2010/0085978 A1* | 4/2010 | Ramankutty et al. ......... | 370/401 |
| 2011/0110317 A1* | 5/2011 | Cleary et al. .................. | 370/329 |
| 2011/0170517 A1* | 7/2011 | Bakker et al. ................ | 370/331 |
| 2011/0171953 A1* | 7/2011 | Faccin et al. ............... | 455/426.1 |
| 2012/0071173 A1* | 3/2012 | Olsson .................. | H04W 60/04 455/456.1 |
| 2013/0003609 A1* | 1/2013 | Ballot et al. ................... | 370/259 |
| 2014/0024340 A1* | 1/2014 | Raleigh ........................ | 455/406 |

FOREIGN PATENT DOCUMENTS

| | | |
|---|---|---|
| CN | 1600036 A | 3/2005 |
| CN | 1934824 A | 3/2007 |

(Continued)

*Primary Examiner* — Anh-Vu Ly
(74) *Attorney, Agent, or Firm* — Jefferson IP Law, LLP (57) ABSTRACT

A method is provided that creates signaling climate data records (CDR) via and a mobile communication system on a network, in order to charge signaling messages sent by user equipment (UE). The invention proposes two embodiments of the method for creating signaling CDR where an MME which has received signaling messages from UE notifies a PGW with a signaling CDR creation function of the message reception, and the PGW creates the signaling CDR. The MME can charge for the signaling message transmitted from the UE, without the additional components.

17 Claims, 6 Drawing Sheets

(56) References Cited

FOREIGN PATENT DOCUMENTS

| JP | 2005-512424 A | 4/2005 |
| JP | 2007-527134 A | 9/2007 |
| KR | 10-0886104 B1 | 3/2009 |

* cited by examiner

MOBILE COMMUNICATION SYSTEM AND METHOD FOR MANAGING SIGNALING MESSAGE IN SYSTEM THEREOF

BACKGROUND OF THE INVENTION

1. Field of the Invention

This invention relates to a mobile communication system and a method for managing signaling messages via the system. More particularly, the invention relates to a method that manages signaling climate data records (CDR) in a network in order to charge for signaling messages transmitted by user equipment, and to a mobile communication system adapted to the method.

2. Description of the Related Art

With the development of wireless communication technology, Machine Type Communication (MTC) is attracted in variety of fields in such a way that it is applied to metering devices. A typical example of the metering device is an electricity meter. The electricity meter is designed to include a communication module. In that case, the electricity meter manager can receive/transmit data from/to the electricity meter or manage it in wireless communication. The metering device may also be gas meters, water meters, etc. MTC may also be applied to logistics.

MTC are mainly applied to metering devices that measure physical quantities that users have used, such as electricity, water, gas, etc., and transmit the measured quantities to them once per a preset period of time. The data size of a metering device is less than that of data communication devices, such as a mobile device, a computer, etc. In addition, the use frequency of a metering device is less than that of data communication devices, such as a mobile device, a computer, etc. On the contrary, metering devices transmits signaling messages more frequent than the data communication devices. If a number of metering devices are connected to a network, they increase load of a core network.

Service providers want to charge for signaling messages of MTC devices as they have charged for data packets. However, conventional mobile communication systems are designed to charge for only data packets that communication devices used, and not equipped with a function for charging for signaling messages. Therefore, a method is required to charge for signaling messages that MTC devices transmitted.

SUMMARY OF THE INVENTION

The invention has been made in view of the above problems, and provides a system and method that can allow mobile communication systems to charge for signaling messages transmitted by user equipment.

In accordance with an exemplary embodiment of the invention, the invention provides a method for managing signaling messages via a Mobility Management Entity (MME), including: creating, if the MME receives a signaling message from user equipment (UE), signaling charging information to charge the UE that transmitted the signaling message; and transmitting the created signaling charging information to a Packet Data Network Gateway (PGW) that creates Signaling climate data record (Signaling CDR).

Preferably, the creation of signaling charging information includes: determining whether the UE that transmitted the signaling message is UE to be charged via the identification information regarding the UE included in the signaling message; and creating the signaling charging information if the UE that transmitted the signaling message is UE to be charged.

Preferably, the transmission of the created signaling charging information to a PGW includes: counting the number of times of reception of the signaling message for a preset period of time; and transmitting, if the preset period of time has elapsed, the signaling charging information including the counted, number of times of reception to the PGW.

Preferably, the transmission of the created signaling charging information to a PGW includes: determining whether the signaling message is a signaling message that is periodically transmitted or that is transmitted when an event occurs; counting, if the signaling message is a signaling message that is periodically transmitted, the number of times of reception of the signaling message; and transmitting, if the signaling message is a signaling message that is transmitted when an event occurs, the signaling charging information including the counted, number of times to the PGW.

Preferably, the creation of signaling charging information includes: creating IP data by using information regarding an uplink (General Packet Radio Service Tunneling Protocol) GTP tunnel of the UE that transmitted the signaling message.

In accordance with another exemplary embodiment of the invention, the invention provides a method for managing signaling messages in a mobile communication system, including: transmitting a signaling message from user equipment (UE) to a Mobility Management Entity (MME); determining, by the MME, whether the UE that transmitted the signaling message is UE to be charged, creating signaling charging information to charge for the signaling message, transmitting the created signaling charging information to a Packet Data Network Gateway (PGW); and creating, by the PGW, a Signaling Climate Data Record (Signaling CDR) via the received signaling charging information.

Preferably, the transmission of the created signaling charging information to a PGW includes: counting the number of times of reception of the signaling message for a preset period of time; and transmitting, if the preset period of time has elapsed, the signaling charging information including the counted, number of times of reception to the PGW.

Preferably, the transmission of the created signaling charging information to a PGW includes: determining whether the signaling message is a signaling message that is periodically transmitted or that is transmitted when an event occurs; counting, if the signaling message is a signaling message that is periodically transmitted, the number of times of reception of the signaling message; and transmitting, if the signaling message is a signaling message that is transmitted when an event occurs, the signaling charging information including the counted, number of times to the PGW.

Preferably, the transmission of the created signaling charging information to a PGW includes: creating IP data by using information regarding an uplink (General Packet Radio Service Tunneling Protocol) GTP tunnel of the UE that transmitted the signaling message.

In accordance with another exemplary embodiment of the invention, the invention provides a mobile communication system for managing signaling messages includes user equipment (UE), a Mobility Management Entity (MME), and a Packet Data Network Gateway (PGW). The UE transmits a signaling message to the MME. The MME creates, if it receives the signaling message, signaling charging information to charge the UE that transmitted the signaling message, and transmits the created signaling charging information to the PGW. The PGW creates a Signaling Climate Data Record (Signaling CDR) via the received signaling charging information.

Preferably, the MME determines whether the UE that transmitted the signaling message is UE to be charged via the identification information regarding the UE included in the signaling message, and creates the signaling charging information if the UE that transmitted the signaling message is UE to be charged.

Preferably, the MME counts the number of times of reception of the signaling message for a preset period of time, and transmits, if the preset period of time has elapsed, the signaling charging information including the counted, number of times of reception to the PGW.

Preferably, the MME: determines whether the signaling message is a signaling message that is periodically transmitted or that is transmitted when an event occurs; counts, if the signaling message is a signaling message that is periodically transmitted, the number of times of reception of the signaling message; and transmits, if the signaling message is a signaling message that is transmitted when an event occurs, the signaling charging information including the counted, number of times to the PGW.

Preferably, the MME creates IP data by using information regarding an uplink (General Packet Radio Service Tunneling Protocol) GTP tunnel of the UE that transmitted the signaling message.

BRIEF DESCRIPTION OF THE DRAWINGS

The features and advantages of the invention will become more apparent from the following detailed description viewed in conjunction with the accompanying drawings, in which.

DETAILED DESCRIPTION OF EXEMPLARY EMBODIMENTS

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

The term 'user equipment (UE)' refers to an information process device that can transmit/receive messages via a network. The UE includes all types of information process devices that can transmit signaling messages. The signaling message includes information for identifying UEs, information regarding a location of UE, and information indicating a state of UE such as the intensity of a signal transmitted/received to/from an eNB. In an embodiment of the invention, it is assumed that UE refers to MTC (Machine Type communication) devices.

MTC devices refer to devices for metering physical quantities used in a place such as a building. Examples of an MTC device are an electricity meter, a water meter, and a gas meter. In particular, MTC devices are equipped with a communication function, so that they can transmit the measured physical quantities to corresponding management servers.

The invention provides a method that can create a signaling climate data record (CDR) in a network so that a mobile communication system can charge for signaling messages transmitted by UE. The embodiment of the invention is described based on a network of a System Architecture Evolution (SAE)/Long Term Evolution (LTE) system standardizes by the 3GPP group. It should be, however, understood that the invention may also be applied to other networks.

The Mobility Management Entity (MME), receiving signaling messages from UE, transmits signaling charging information for charging the UE for the signaling messages to a Packet data Network Gateway (PGW) with a signaling CDR creating function, so that the PGW creates the signaling CDR. A brief description is as follows.

The MME transmits an NAS message to the PGW, via a control plane, in order to notify the PGW that a signaling message is received. The MME may also transmit signaling charging information to the PGW each time that a signaling message is received, every a period of time during which the number of signaling messages received is counted, or each time that a signaling message for notifying that an event occurred in UE is receive. Alternatively, the MME may create IP data including signaling charging information by using the stored UE context, and transmit it to the PGW via the user plane. The PGW creates signaling CDR using the received signaling charging information.

The following description provides a method for charging for signaling messages transmitted by UE, referring to FIGS. 1 to 6.

Figure 1:
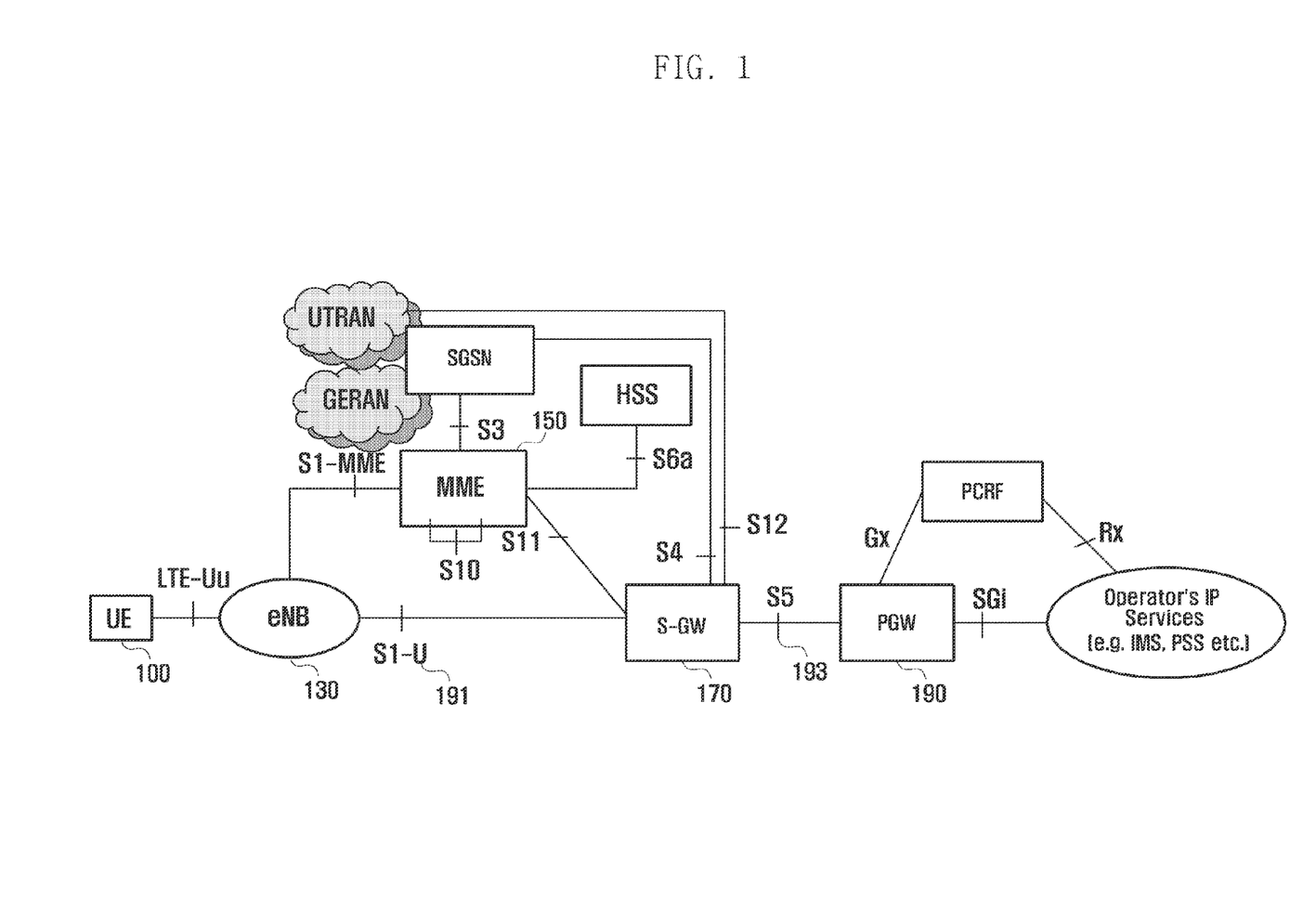
FIG. 1 illustrates a configuration of a mobile communication system according to an embodiment of the invention.

FIG. 1 illustrates a configuration of a mobile communication system according to an embodiment of the invention.

Referring to FIG. 1, the mobile communication system includes user equipment (UE) 100, an eNodeB (eNB) 130, a Mobility Management Entity (MME) 150, a Serving Gateway (SGW) 170, and a Packet Data Network Gateway (PDN Gateway or PGW) 190.

The UE 100 refers to a device that can transmit/receive data via a network. In an embodiment of the invention, it is assumed that the UE 100 is an MTC device. The MTC device 100 may be an electricity meter, a water meter, a gas meter, etc. that is equipped with a communication function, and may include a mobile device, a computer, etc. The UE 100 can transmit signaling message including information such as measured data of physical quantities such as electricity and water, the UE identification information, the UE location information, and information regarding nearby eNBs.

The eNB 130 is a base station connected to the UE 100.

The MME 150 refers to an entity for managing the mobility of the UE 100 in an SAE/LTE system. The MME 150 transmits signaling charging information to the PGW 190, by using the signaling messages that the UE transmits via the eNB 130. The MME 150 detects the identification information regarding the UE 100, included in the received signaling message. The MME 150 determines whether the UE 100 that transmitted the signaling message is UE to be charged, via the detected UE identification information.

If the MME 150 ascertains that the UE 100 that transmitted the signaling message is UE to be charged, it creates signaling charging information and transmits it to the PGW 190. The signaling charging information includes identification information regarding the UE 100 that transmitted a signaling message, information regarding a type of signaling message, information regarding the transmission number of signaling messages, etc. The signaling message refers to a message including information regarding the states of the UE, e.g., a message transmitted when the UE identification information is altered, a message transmitted when the location of UE is altered, a message transmitted when eNB connected to UE is altered, etc. When UE 100 moves to other 3GPP system, the SGW 170 manages the mobility and the packet routing process. The PGW 190 allocates an IP address to the UE 100, manages the connection of data packets, and creates signaling CDR according to the data packet.

S1-U 191 is a reference point between the eNB 130 and the SGW 170, operates a user plane tunneling function, and uses General Packet Radio Service User Plane (GTP-U) as a type of traffic protocol.

S5 193 is a reference point between the SGW 170 and PGW 190, operates a user plane tunneling function and a tunnel management function, and uses General Packet Radio Service Tunneling Protocol (GTP) or Proxy Mobile IP (PMIP) related protocol. The embodiment of the invention is described based on S5 GTP protocol.

If UE 100 transmits a signaling message to MME 150 via eNB 130 in the mobile communication system configured as described above, MME 150 creates signaling charging information according to the signaling message and transmits it to PGW 190. The MME 150 determines whether the UE 100 that transmitted the signaling message is UE to be charged, via the identification information regarding the UE 100 included in the signaling message. The MME 150 transmits signaling charging information to the PGW 190 each time when receiving the signaling messages from the UE 100. Alternatively, the MME 150 detects the number of times of reception of signaling messages for a preset period of time, and transmits signaling charging information including the detected, number of times of reception of signaling messages to the PGW 190 every the period of time. Alternatively, the MME 150 detects a type of received signaling message and transmits the signaling charging information according to the detected type of signaling message to the PGW 190.

The MME 150 notifies the PGW 190 of the reception of a signaling message from the UE 100, via a control plane message including the signaling charging information. The control plane message refers to a message proposed according to the invention and serves to notify the PGW 190 of the reception of a signaling message. The transmission of a control plane message including signaling charging information from the MME 150 to the PGW 190 is classified into the following three methods.

First, the MME 150 transmits a control plane message to the PGW 190 each time that the MME 150 receives a signaling message from the UE 100.

Second, the MME 150 transmits a control plane message to the PGW 190 every a period of time during which the MME 150 counts the number of received signaling messages.

Third, the MME 150 transmits a control plane message to the PGW 190 each time that the MME 150 receives a signaling message for notifying that an event occurred in the UE 100.

Figure 2:
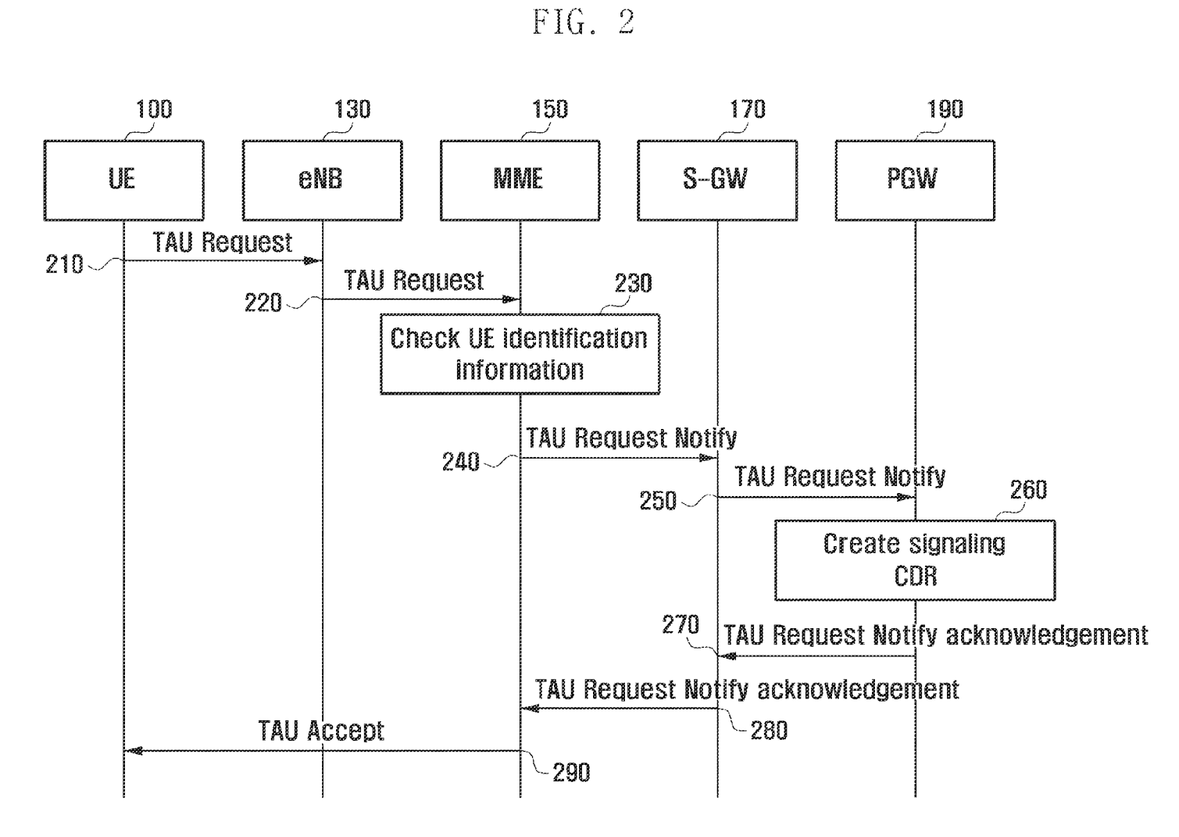
FIG. 2 illustrates a flowchart that describes a method for transmitting signaling charging information according to a first embodiment of the invention.

The following description is provided regarding the first method for transmitting signaling charging information each time when receiving a signaling message in the mobile communication system, referring to FIG. 2.

FIG. 2 illustrates a flow chart that describes a method for transmitting signaling charging information according to a first embodiment of the invention. In the embodiment, it is assumed that the signaling message transmitted from the UE 100 is a Tracking Area Update (TAU) Request message. The TAU Request message serves to notify a network of the location of the UE 100. The UE 100 may periodically transmit a TAU Request message to the network, which is called a periodic TAU Request message, or may transmit a TAU Request message to the network when an event occurs, which is called an event triggered TAU Request message. It should be understood that the invention may also include other messages.

Each time that the MME 150 receives a signaling message, i.e., a periodic TAU Request message and an event triggered TAU Request message, from the UE 100, the MME 150 transmits the control plane message to the PGW 190 in order to notify the PGW 190 of the reception of the signaling message. The mobile communication system manages signaling messages as follows.

Referring to FIG. 2, the UE 100 transmits a TAU Request message to eNB 130 periodically or when an event occurred (210). The TAU Request message serving as a signaling message includes UE identification information, information regarding a location where the UE is located, etc. The event occurs when the UE 100 moves and the information regarding the eNB is thus altered. The event also occurs when the identification information regarding the UE 100 is altered, and this needs to be notified to the MME 150.

The eNB 130 transmits the TAU Request message to the MME 150 (220). The MME 150 detects the identification information regarding the UE 100 included in the received TAU Request message and determines whether the UE 100 is UE to be charged (230). The determination as to whether the UE 100 is UE to be charged may be made by determining whether the identification information regarding the UE 100 is included in a list of charging UEs set by a service provider of the MME 150. Alternatively, the determination as to whether the UE 100 is UE to be charged may also be made by determining whether the UE 100 is UE for performing a communication function or a specific function, via the identification information regarding the UE 100.

If the MME 150 ascertains that the UE 100 that transmitted the signaling message is UE to be charged at step 230, it transmits a TAU Request Notify message, defined as a control plane message, to the SGW 170 (240). The TAU Request Notify message refers to a control plane message proposed according to the invention and serves to notify the PGW 190 of the reception of a TAU Request message from the UE 100. The TAU Request Notify message includes signaling charging information. Signaling charging information includes identification information regarding UE, information regarding a type of signaling message, information regarding the number of times of transmission, etc. Although the embodiment is described in such a way that the TAU Request Notify is a message for notifying the TAU Request, it should be understood that the invention is not limited to the embodiment. That is, a Notify message meaning all types of signaling arrivals may be implemented in such a way that a TAU Request is included in one parameter.

The SGW 170 transmits the TAU Request Notify message to the PGW 190 (250). The PGW 190 identifies the received TAU Request Notify message and creates Signaling Climate Data Record (Signaling CDR) (260). That is, the PGW 190 detects the identification information regarding the UE 100 included in the received TAU Request Notify message and creates Signaling CDR allocated to the UE 100. After that, the PGW 190 transmits the TAU Request Notify acknowledgement message, replying to the reception of the TAU Request, to the SGW 170 (270).

The SGW 170 transmits the TAU Request Notify acknowledgement message to the MME 150 (280). The MME 150 transmits, to the UE 100, a TAU Accept message as a reply to the TAU Request message at step 220 (290). Although the embodiment is implemented in such a way that the TAU Accept message is transmitted to the UE 100 at step 290, it should be understood that the invention is not limited to the embodiment. For example, the embodiment may be modified in such a way that the TAU Accept message is transmitted to the UE 100 after step 230.

The foregoing description is provided regarding a method that transmits the control plane message including signaling charging information each time that signaling messages are received. The following description is provides a method that detects the number of received signaling messages for a certain period of time and charges for the messages, referring to FIG. 3.

Figure 3:
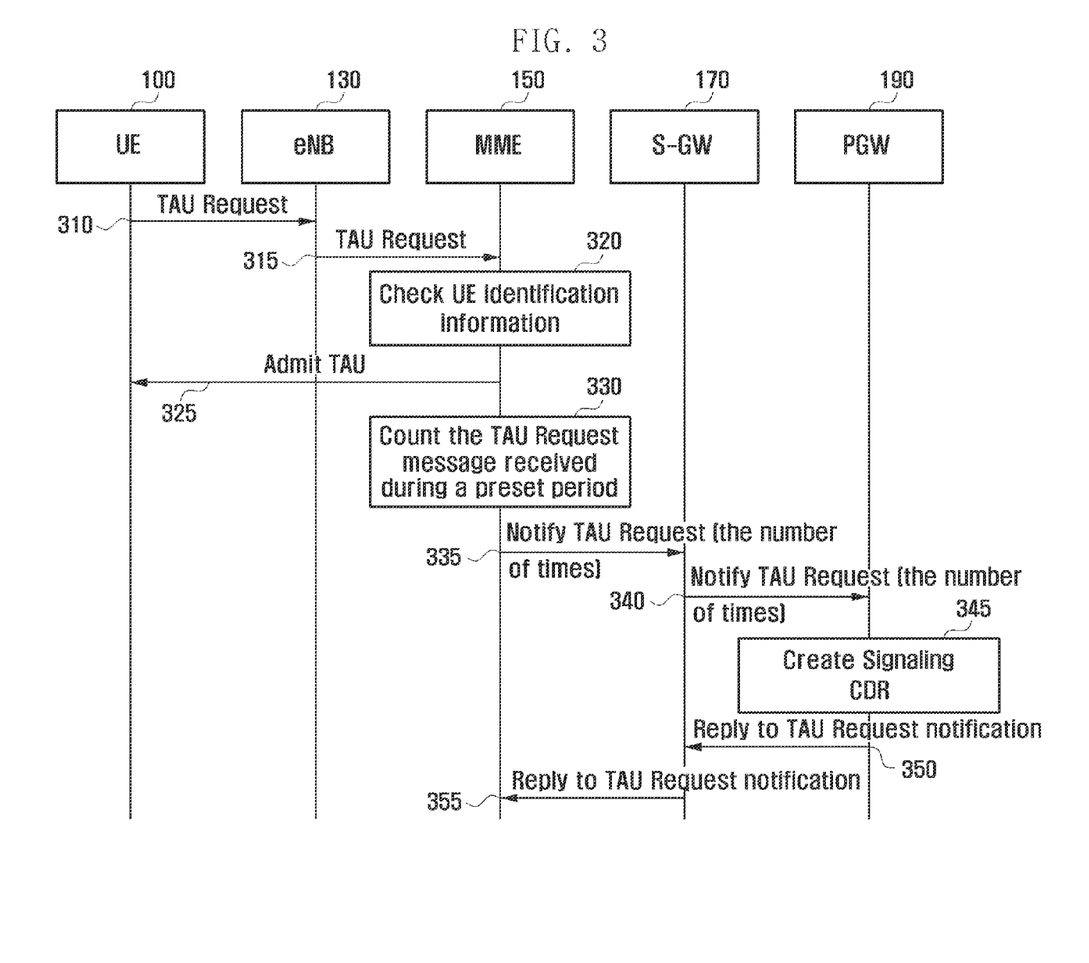
FIG. 3 illustrates a flowchart that describes a method for transmitting signaling charging information, according to periods of time, according to a second embodiment of the invention.

FIG. 3 illustrates a flowchart that describes a method for transmitting signaling charging information, according to periods of time, according to a second embodiment of the invention. In the embodiment, it is assumed that the signaling message transmitted from the UE 100 is a Tracking Area Update (TAU) Request message.

The MME 150 detects the number of times of reception of a periodic TAU Request message and the number of times of reception of an event triggered TAU Request message for a period of time, and transmits the detected numbers of times of reception to the PGW 190 every the period of time.

Referring to FIG. 3, the UE 100 transmits a TAU Request message to eNB 130 periodically or when an event occurred (310). The eNB 130 transmits the TAU Request message to the MME 150 (315). The TAU Request message serving as a signaling message includes UE identification information, information regarding a location where the UE is located, etc.

The MME 150 detects the identification information regarding the UE 100 included in the received TAU Request message and determines whether the UE 100 is UE to be charged (320). The determination as to whether the UE 100 is UE to be charged may be made by determining whether the identification information regarding the UE 100 is included in a list of charging UEs set by a service provider of the MME 150. Alternatively, the determination as to whether the UE 100 is UE to be charged may also be made by determining whether the UE 100 is UE for performing a communication function or a specific function, via the identification information regarding the UE 100.

The MME 150 transmits, to the UE 100, a TAU Accept message as a reply to the TAU Request message (325). After that, the MME 150 counts the number of times of reception of the TAU Request messages from the UE 100 for a preset period of time (330). If the period of time has elapsed, the MME 150 transmits a control plane message proposed according to the invention, i.e., a TAU Request Notify message, to the SGW 170 (335). The TAU Request Notify message includes signaling charging information and information regarding the number of times of reception of the received TAU Request messages, counted at step 330.

The SGW 170 transmits the TAU Request Notify message to the PGW 190 (340). The PGW 190 identifies the received TAU Request Notify message and creates Signaling CDR (345). That is, the PGW 190 detects the identification information regarding the UE 100 and the number of times of reception of the signaling messages included in the received TAU Request Notify message. After that, the PGW 190 creates Signaling CDR that will be allocated to the identified UE 100. After that, the PGW 190 transmits the TAU Request Notify acknowledgement message including the created Signaling CDR to the SGW 170 (350). The SGW 170 transmits the TAU Request Notify acknowledgement message to the MME 150 (355). After that, although it is not shown in the drawing, the MME 150 transmits, to the UE 100, a TAU Accept message as a reply to the received TAU Request message.

Figure 4:
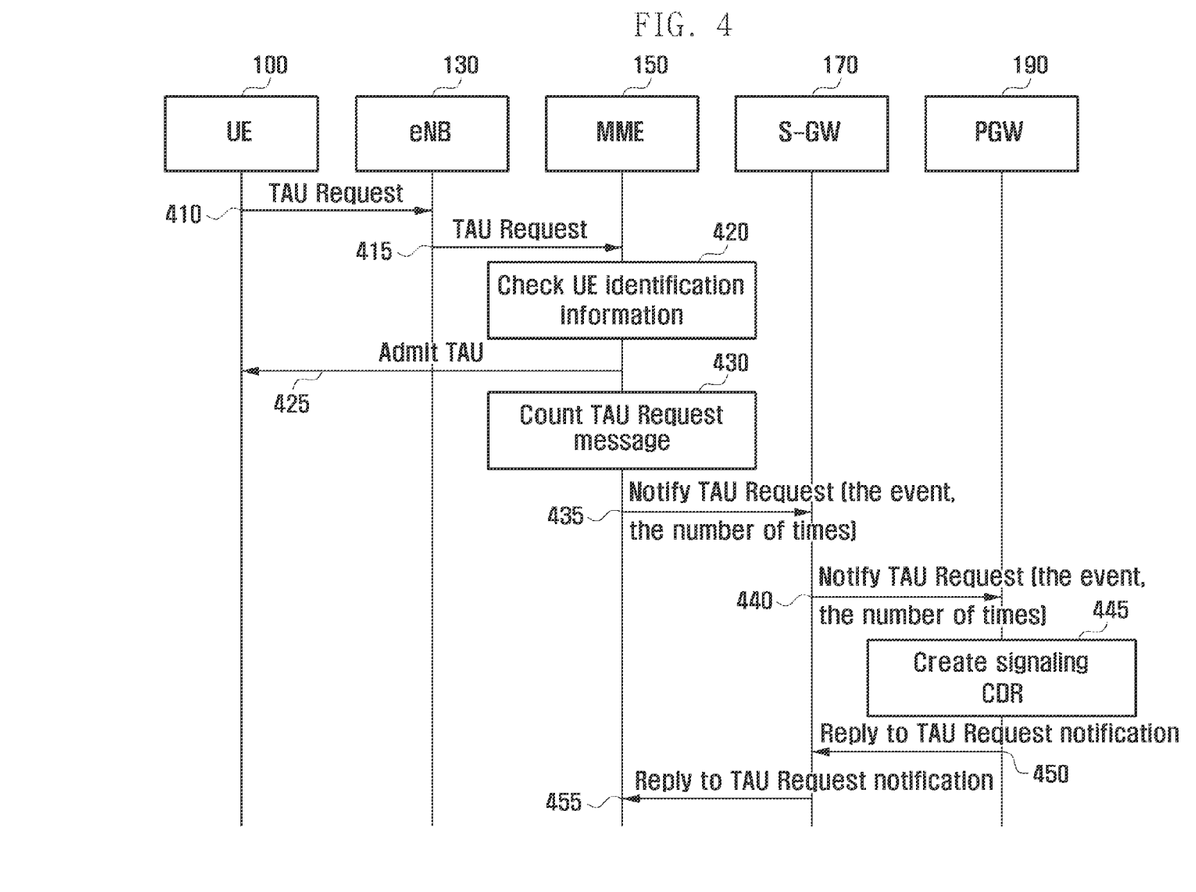
FIG. 4 illustrates a flow chart that describes a method for transmitting signaling charging information, according to transmitted signaling messages, according to a third embodiment of the invention.

The following description is provides a method that transmits signaling charging information, according to types of signaling messages, in the mobile communication system, referring to FIG. 4.

FIG. 4 illustrates a flowchart that describes a method for transmitting signaling charging information, according to transmitted signaling messages, according to a third embodiment of the invention.

The MME 150 periodically counts the number of times of reception of a periodic TAU Request message including the location information regarding the UE 100. If the MME 150 receives an event triggered TAU Request message, it includes the information regarding the counted, number of times of reception of a periodic TAU Request message in a message for notifying the PGW 190 of the reception of the event triggered TAU Request message, and transmits the notification message to the PGW 190.

Referring to FIG. 4, the UE 100 transmits a TAU Request message to eNB 130 periodically or when an event occurred (410). The eNB 130 transmits the TAU Request message to the MME 150 (415). The MME 150 detects the identification information regarding the UE 100 included in the received TAU Request message and determines whether the UE 100 is UE to be charged (420). The MME 150 transmits, to the UE 100, a TAU Accept message as a reply to the TAU Request message (425).

The MME 150 determines whether the TAU Request message transmitted from the UE 100 is a periodic TAU Request message that is periodically transmitted or an event triggered TAU Request message that is transmitted when an event occurs (430). The event occurs when the UE 100 moves and the information regarding the eNB is thus altered. The event also occurs when the identification information regarding the UE 100 is altered, and this needs to be notified to the MME 150.

If the TAU Request message is a periodic TAU Request message, the MME 150 counts the number of times of reception of signaling messages at step 430. On the contrary, if the TAU Request message is an event triggered TAU Request message, the MME 150 transmits the TAU Request Notify message to the SGW 170 (435). The TAU Request Notify message includes signaling charging information. The signaling charging information may include a parameter indicating a type of event that causes the UE 100 to transmit the TAU Request message.

The MME 150 includes the parameter corresponding to an event that causes the TAU Request message in the signaling charging information so that it can make an additional charge the UE 100 for a signaling message that the UE 100 transmitted in a specific situation. For example, assuming that a contract is made between a service provider using MME 150 and a service provider of UE 100 so that: they shall make a reasonable charge since UE 100 that moves or is fixed only in a preset range of local area causes a small amount of signaling load in a network although the UE 100 moves; and, if the UE 100 moves, they shall make the extra charge, if the UE 100 moves to another local area and transmits a TAU Request message to the MME 150, the MME 150 transmits the movement information regarding the UE 100, via the event parameter, to the PGW 190. In that case, the MME service provider can make extra charge according to the movement of the UE 100. In addition, the signaling charging information includes information regarding the number of times of reception of a periodic TAU Request message from the UE 100 until an event triggered TAU Request message is received.

The SGW 170 transmits the TAU Request Notify message to the PGW 190 (440). The PGW 190 identifies the received TAU Request Notify message and creates Signaling CDR (445). That is, the PGW 190 detects the identification information regarding the UE 100 and the number of times of reception of signaling messages, included in the received TAU Request Notify message, and creates the Signaling CDR that will be allocated to the identified UE 100.

After that, the PGW 190 transmits the TAU Request Notify acknowledgement message including the created Signaling CDR to the SGW 170 (450). The SGW 170 transmits the TAU Request Notify acknowledgement message to the MME 150 (455). After that, although it is not shown in the drawing, the MME 150 transmits, to the UE 100, a TAU Accept message as a reply to the received TAU Request message.

It should be understood that modifications can be implemented by combining the first to third embodiments described above with each other. For example, if the MME 150 receives: an event triggered TAU Request message, it may transmit the TAU Request Notify message to the PGW 190 as the first embodiment; and a periodic TAU Request message, it counts the number of times of reception of signaling messages for a preset period of time and then transmits the TAU Request Notify message including the counted, number of times to the PGW 190 as the second embodiment. The PGW 190 identifies the received TAU Request message and creates the Signaling CDR.

Figure 5:
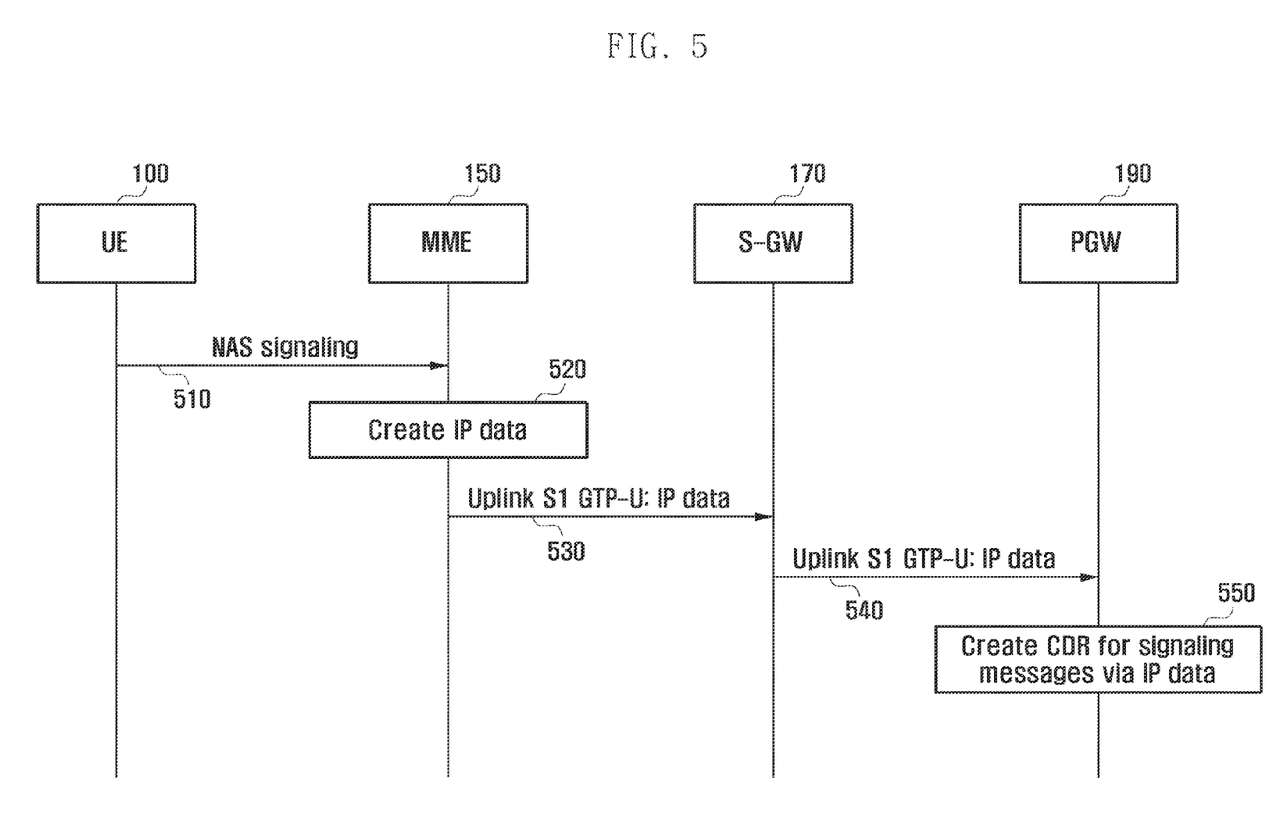
FIG. 5 illustrates a flow chart that describes a method for transmitting signaling charging information, according to data of user equipment, according to a fourth embodiment of the invention.

FIG. 5 illustrates a flow chart that describes a method for transmitting signaling charging information, according to data of UEs, according to a fourth embodiment of the invention. In the embodiment, it is assumed that user data as the identification information regarding the UE 100 is IP data. The MME 150 includes information regarding the uplink of the UE 100, S1-U GTP tunnel. The SGW 170 maintains the resource for the uplink, S1-U GTP tunnel while the UE is connected to the network. The information regarding the S1-U GTP tunnel may be an IP address of the SGW 170 and GTP TEID. The uplink S5 GTP-U between the SGW 170 and the PGW 190 is also maintained while the UE 100 is connected to the network.

If the MME 150 receives a signaling message from the UE 100, it creates IP data of the UE 100 and transmits it to the PGW 190 via the S1-U GTP tunnel information. It is assumed that the IP data matches, one-to-one, with the signaling message transmitted from the UE 100. Therefore, when the PGW 190 receives the IP data from the MME 150, it can ascertain that the MME 150 has received the signaling message without analyzing the IP data. The PGW 190 includes the signaling message in the IP data, created by the MME 150, and transmits it.

Referring to FIG. 5, the UE 100 transmits an NAS signaling message to the MME 150 (510). The NAS signaling message may include a TAU Request message described in the first to third embodiments. After that, the MME 150 creates IP data transmitting the signaling message, by using the uplink S1-U GTP tunnel information (520).

The MME 150 transmits the created IP data to the SGW 170 via uplink S1 GTP-U (530). The SGW 170 transmits the IP data to the PGW 190 via the uplink S5 GTP-U (540). The PGW 190 identifies the received IP data and creates the Signaling CDR (550).

As described above, the mobile communication system can charge for the signaling messages transmitted from the UE 100. The following description is provided regarding a method for creating and managing signaling charging information according to signaling messages received by the MME 150, referring to FIG. 6.

Figure 6:
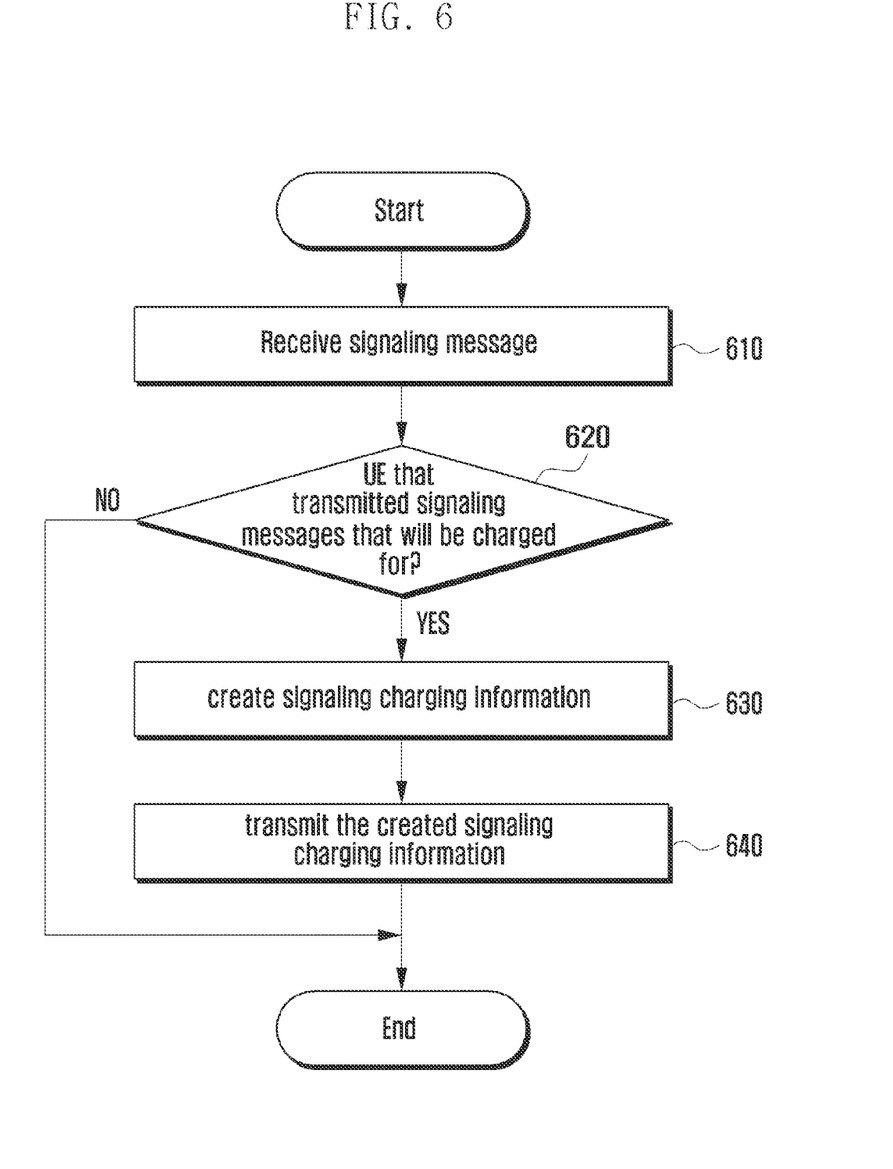
FIG. 6 illustrates a flow chart that describes a method for managing signaling messages in an MME, according to an embodiment of the invention.

FIG. 6 illustrates a flowchart that describes a method for managing signaling messages in an MME, according to an embodiment of the invention.

Referring to FIG. 6, if the MME 150 receives a signaling message from the UE 100 (610), it determines whether the UE 100 that transmitted the signaling message is UE to be charged (620). The signaling message includes identification information regarding the UE 100 that transmitted the signaling message, the location information regarding the UE 100, and information related to data acquired by measuring physical quantities, e.g., the amount of electricity, the amount of water. The determination as to whether the UE 100 that transmitted the signaling message is UE to be charged may be made by the identification information regarding the UE 100 included in the signaling message. A service provide of the MME 150 has identification information regarding UEs to be charged in a list. Therefore, if the MME 150 receives a signaling message, it determines whether the identification information regarding the UE 100, included in the received signaling message, is registered in the list of charging UEs set by the service provider of the MME 150.

If the MME ascertains that the UE 100 that transmitted the signaling message is UE to be charged at step 620, it creates the signaling charging information (630). The signaling charging information includes the identification information regarding the UE 100, the location information regarding the UE 100, and the number of times of reception of signaling messages, and information regarding the type of signaling message.

After that, the MME 150 transmits a control plane message including the created signaling charging information to the PGW 190 (640). The MME 150 may transmit, to the PGW 190, the control plane message including the signaling charging information, each time that it receives the signaling message. Alternatively, the MME 150 counts the number of times of reception of signalling messages for a preset period of time, includes the counted, number of times in the signalling charging information after the period of time has elapsed, and then transmits it to the PGW 190. Alternatively, the MME 150 identifies a type of received signaling message, it counts, if the type of message is a periodic TAU Request message, the number of times of reception or signaling messages; and transmits, if it is an event triggered TAU Request message, the signaling charging information including the counted number of times to the PGW 190. If the MME 150 receives a signaling message from the UE 100, it creates IP data using information regarding the uplink of the UE 100, GTP tunnel, and transmits the signaling charging information including the created IP data to the PGW 190.

As described above, the mobile communication system according to the invention can charge for signaling messages transmitted by UE. The LTE system according to the invention can also charge for signaling messages transmitted from UE, without altering the configuration of a Mobility Management Entity (MME).

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method for managing a tracking area update (TAU) request message by a network entity, the method comprising:
receiving the TAU request message including control information from a terminal;
identifying, whether the TAU request message is to be charged; and
providing a charging entity with information comprising an identification of the terminal and a counted number of times of receiving the TAU request message to be charged during a preset period of time,
wherein the charging entity obtains a signaling charging data corresponding to the terminal based on the information.

2. The method of claim 1, wherein the identifying of whether the AU request message is to be charged comprises:
determining whether the terminal is a terminal to be charged or whether the terminal is a terminal performing a specific function, based on the identification of the terminal included in the TAU request message.

3. The method of claim 1, wherein the TAU request message comprises a first signaling message which is periodically transmitted from the terminal and a second signaling message which is transmitted from the terminal when an event occurs at the terminal.

4. The method of claim 3, wherein the providing the charging entity with the information comprises:
providing, if receiving the second signaling message, the charging entity with the information comprising the identification of the terminal and the counted number of times of receiving the first signaling message to be charged, and a type of the event.

5. The method of claim 1, wherein the preset period of time is set prior to receiving the signaling message.

6. A method for charging a tracking area update (TAU) request message by a charging entity, the method comprising:
receiving, from a network entity, information comprising an identification of a terminal and a counted number of times of receiving the TAU request message to be charged, obtained by the network entity from the terminal during a preset period of time, the TAU request message including control information;
obtaining a signaling charging data corresponding to the terminal based on the information comprising the identification of the terminal and the counted number of times of receiving the signaling TAU request message; and
wherein the TAU request message is identified to be charged by the network entity.

7. The method of claim 6, wherein the TAU request message is identified to be charged by the network entity if the terminal is determined to be charged or perform a specific function based on the identification of the terminal included in the TAU request message.

8. The method of claim 6, wherein the TAU request message comprises a first signaling message which is periodically transmitted from the terminal and a second signaling message which is transmitted from the terminal when an event occurs at the terminal,
wherein the receiving of the information comprises:
receiving, if the network entity receives the second signaling message, the information comprising the identification of the terminal, a counted number of times of receiving, by the network entity, the first signaling message to be charged and a type of the event.

9. The method of claim 8, wherein the obtaining of the signaling charging data comprises obtaining the signaling charging data corresponding to the terminal based on the counted number of receiving, by the network entity, the first signaling message to be charged, if the received information comprises the type of the event.

10. A network entity for managing a tracking area update (TAU) request message, the network entity comprising:
a transceiver for transmitting and receiving a signal; and
a controller configured to:
control to receive the TAU request message including control information from a terminal,
identify whether the TAU request message is to be charged, and
provide a charging entity with information comprising an identification of the terminal and a counted number of times of receiving the TAU request message to be charged during a preset period of time,
wherein the charging entity obtains a signaling charging data corresponding to the terminal based on the received information.

11. The network entity of claim 10, wherein the controller is further configured to determine, whether the terminal is a terminal to be charged or a terminal performing a specific function, based on the identification of the terminal included in the TAU request message.

12. The network entity of claim 11, wherein the TAU request message comprises a first signaling message which is periodically transmitted from the terminal and a second signaling message which is transmitted from the terminal when an event occurs at the terminal.

13. The network entity of claim 12, wherein the controller is further configured to provide, if the network entity receives the second signaling message, the charging entity with the information comprising the identification of the terminal, the counted number of receiving the first signaling message to be charged and a type of the event.

14. The network entity of claim 10, wherein the network entity comprises a mobility management entity (MME) and the charging entity comprises a packet data network gateway (PGW).

15. A charging entity for charging a tracking area update (TAU) request message, the charging entity comprising:
a transceiver for transmitting and receiving a signal; and
a controller configured to:
receive information, transmitted by a network entity, comprising an identification of a terminal and a counted number of times of receiving the TAU request message to be charged, obtained by the network entity from the terminal during a preset period of time, the TAU request message including control information, and obtain a signaling charging data corresponding to the terminal based on the received information.

16. The charging entity of claim 15, wherein the TAU request message comprises a first signaling message which is periodically transmitted from the terminal and a second signaling message which is transmitted from the terminal when an event occurs at the terminal, and wherein the controller is further configured to receive, if the network entity receives the second signaling message, the information comprising the identification of the terminal, the counted number of times of receiving, by the network entity, the first signaling message to be charged, and a type of the event.

17. The charging entity of claim 16, wherein the controller is further configured to obtain the signaling charging data corresponding to the terminal based on the counted number of times of receiving, by the network entity, the first signaling message to be charged, if the received information includes the type of the event.

* * * * *